Jan. 8, 1963 T. F. CRAMER 3,072,210
AUTOMOBILE SPEED CONTROL SYSTEM
Filed June 1, 1959 2 Sheets-Sheet 1
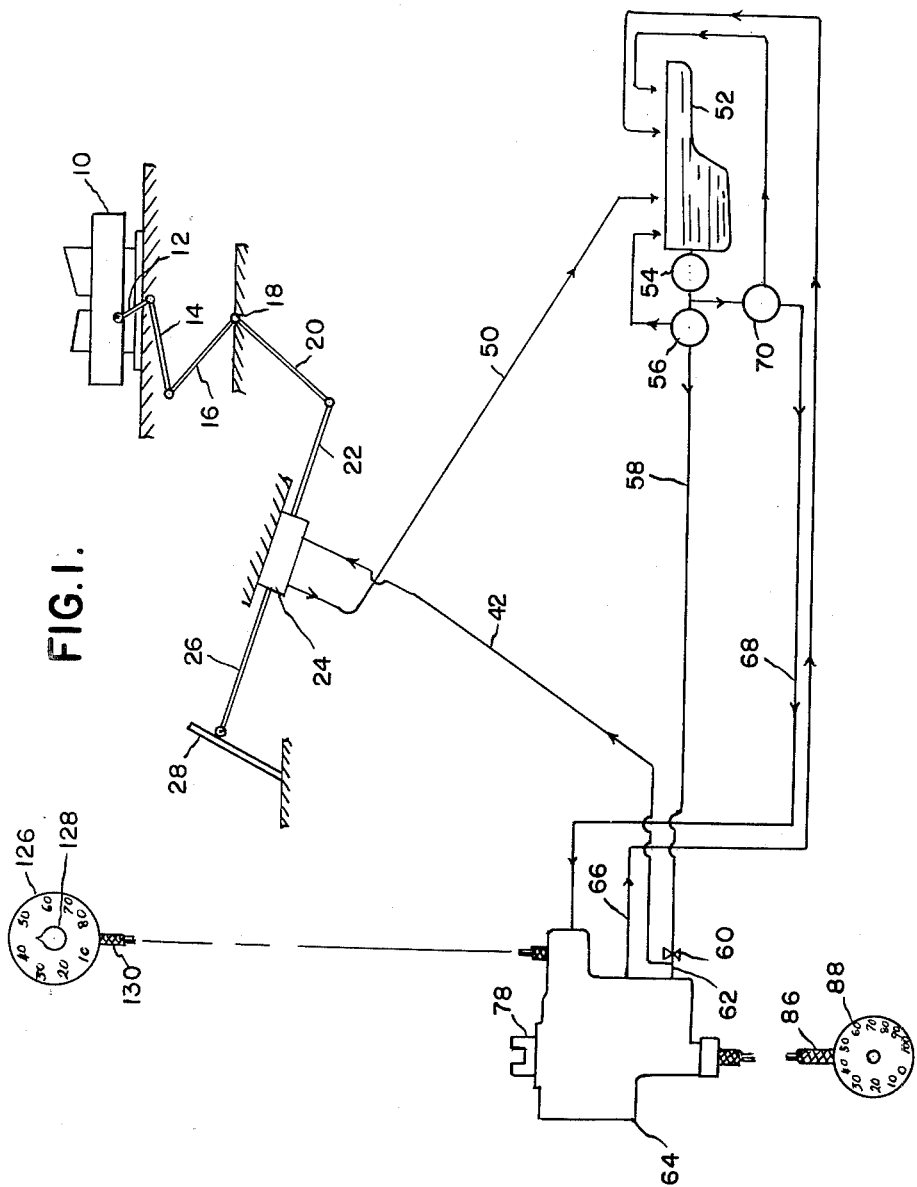
INVENTOR.
THOMAS F. CRAMER
BY
ATTORNEYS Jan. 8, 1963     T. F. CRAMER     3,072,210
AUTOMOBILE SPEED CONTROL SYSTEM
Filed June 1, 1959     2 Sheets-Sheet 2

INVENTOR.
THOMAS F. CRAMER
BY
ATTORNEYS

United States Patent Office 3,072,210
Patented Jan. 8, 1963

3,072,210
AUTOMOBILE SPEED CONTROL SYSTEM
Thomas F. Cramer, Stratford, Ontario, Canada, assignor to Holley Carburetor Company, Van Dyke, Mich., a corporation of Michigan
Filed June 1, 1959, Ser. No. 817,325
12 Claims. (Cl. 180—82.1)

The present invention relates to an automobile speed control system.

It is an object of the present invention to provide a speed control system in which means are provided effective at a preselected speed to oppose movement of the accelerator pedal in the direction to increase vehicle speed.

It is a further object of the present invention to provide a system as described in the preceding paragraph in which the means opposing accelerating movement of the pedal is hydraulic means and is applied in such a way that the operator of the vehicle may overcome the resistance if conditions demand acceleration even though the road speed is above the preselected driving speed.

It is a further object of the present invention to provide a system as described in the preceding paragraph in which, when the accelerator pedal is fully depressed, the force tending to move the accelerator pedal in a decelerating direction is substantially eliminated.

It is a further object of the present invention to provide a vehicle road speed control system including speed selector means operable from the driver's compartment.

It is a further object of the present invention to provide a vehicle road speed control system including speed responsive means operable at and above a preselected vehicle speed to apply a force to the accelerator pedal tending to move the pedal in speed reducing direction.

Other objects and features of the invention will become apparent as the description proceeds, especially when taken in conjunction with the accompanying drawings, illustrating a preferred embodiment of the invention, wherein:

FIGURE 1 is a diagrammatic view of the speed control system.

Figure 3:
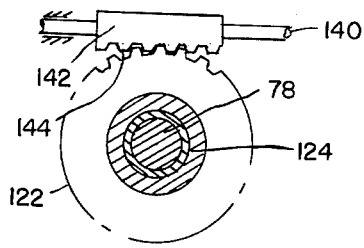
FIGURE 3 is a diagrammatic sectional view on the line 3—3, FIGURE 2.

Referring first to FIGURE 1, the system is shown as applied to a motor vehicle having an internal combustion engine including a carburetor 10 provided with the usual throttle plates (not shown) primary control of which is accomplished by a lever 12 connected by a link 14 to a bell crank 16 which is pivoted as indicated at 18 and has one arm 20 connected to a link or actuating rod 22. The rod 22 extends from a pressure actuated speed control device 24 and is under primary control of a rod 26 connected to the usual accelerator pedal 28. As will subsequently be described, the pressure actuated speed control device 24 includes means for applying a force to the rods or links 22, 26 in a direction tending to move the accelerator pedal 28 in speed reducing direction.

Figure 4:
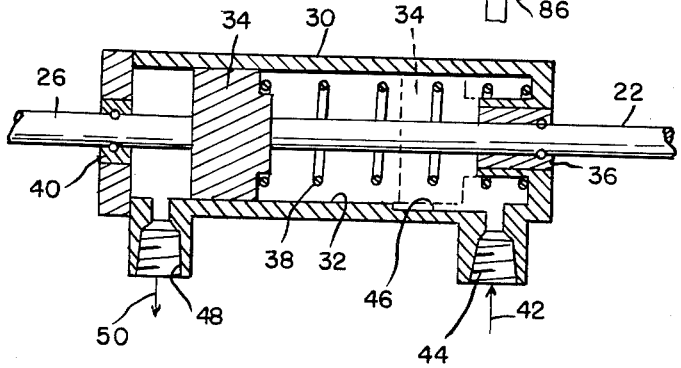
FIGURE 4 is a sectional view through the pressure actuated speed control device.

Referring now to FIGURE 4, the arrangement of the pressure actuated speed control device is illustrated in detail. As seen in this figure the device comprises a housing 30 defining an elongated cylinder 32 therein in which is movable a piston 34. The rod 22 extends through a sealing bushing 36 into the cylinder 32 and is connected to or engageable with the piston 34. Also received in the cylinder 32 is a compression spring 38 tending to move the piston to the left and hence to move the accelerator pedal in a speed reducing direction. The rod 26 which is connected to the accelerator pedal 28, extends through a bushing 40 into the interior of the cylinder 32 and is connected to or engageable with the opposite end of the piston 34.

When governed speed is attained, hydraulic fluid under a regulated pressure as will subsequently be described, is admitted through a passage 42 to a connection 44 leading to the interior of the cylinder 32 at the right of the piston 34 as seen in FIGURE 4. Under these circumstances fluid pressure acts on the piston 34 and tends to move the accelerator pedal and throttle in speed reducing direction. However, means are provided to prevent the application of fluid pressure as just described when the accelerator pedal is fully depressed. The hydraulic system, as will subsequently be described, is non-positive in action so that the operator may at any time move the accelerator pedal 28 against the resistance afforded by the spring 38 and any fluid pressure existing within the cylinder 32 in a speed increasing direction. This is a safety feature since situations constantly arise during normal driving when it is necessary to exceed a preselected driving speed for short intervals.

The interior of the cylinder 32 is relieved as indicated at 46 so that when the piston 34 is moved to the extreme right (corresponding to the fully depressed position of the accelerator pedal), fluid escapes through the passage provided by the relieved portion 46 and the side of the piston 34. Thus, the operator may maintain the accelerator pedal fully depressed without excessive effort so long as he desires. This is a second safety feature. In emergencies when it is imperative to increase the vehicle speed at the maximum rate, the operator floors the accelerator pedal. If at this time the accelerator pedal was subjected to a relatively greater than usual force tending to move it in speed reducing direction, it might result in speed reducing movement of the accelerator pedal. This is particularly true since the condition envisaged may be passing another vehicle, or an emergency condition in which the operator's attention might be distracted or sufficiently occupied by other considerations.

The housing 30 is provided with a vent connection 48 adapted to be connected by a conduit 50 leading to a reservoir 52.

The hydraulic fluid for applying the signal to the accelerator pedal comprises the reservoir 52 previously referred to, and a pump 54. A pressure regulating bypass valve 56 is connected to the pump and a fluid pressure supply line 58 leads from the pressure regulating valve to a restriction 60. The restriction 60 determines the base pressure in the system.

Beyond the restriction 60 the line 58 connects to the supply passage 42 leading to the pressure actuated speed control device 24.

A second branch line 62 leads to a hydraulic road speed control valve indicated generally at 64. A drain line 66 leads from the valve 64 to the reservoir 52. Another fluid pressure supply line 68 is connected to the pump 54 through a pressure regulating bypass valve 70 and connects to the valve 64 as will subsequently be described.

Figure 2:
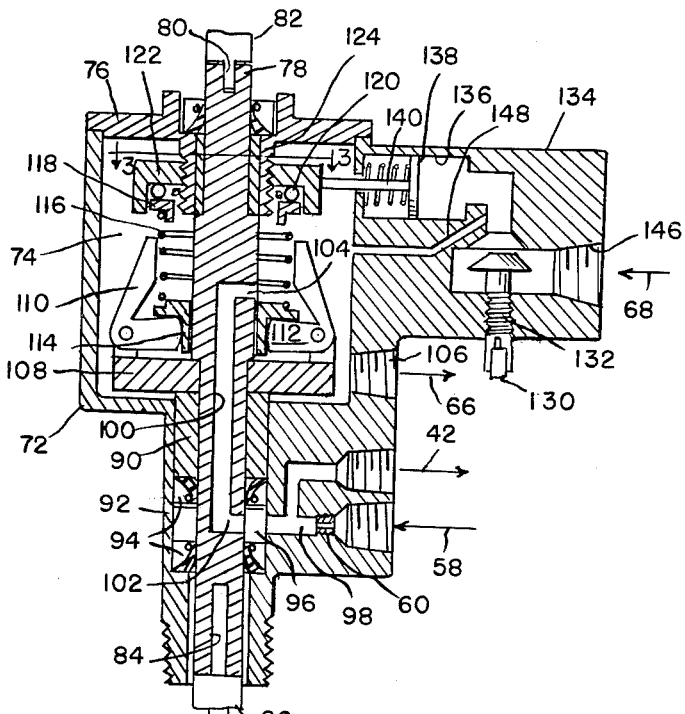
FIGURE 2 is a sectional view through the hydraulic road speed control valve incorporated in the system.

Referring now to FIGURE 2, the hydraulic road speed control valve is shown in detail. This valve comprises a housing 72 shaped to form a chamber 74 provided with a removable closure 76. Extending from the chamber is a spinner shaft 78 provided with a slot 80 at one end adapted to be engaged by a rotary driver 82 operated by the vehicle at a speed dependent on road speed. The drive shaft 82 may be directly connected as by gearing to the transmission or it may be connected thereto by a flexible drive cable if desired. The opposite end of the shaft 78 is also slotted as indicated at 84 for connection to a drive cable 86, which may be a flexible drive cable, extending to the speedometer 88.

Below a bushing 90 and within an extension 92 of the housing 72 are a pair of shaft seals 94 defining between them an annular chamber 96 connected by a passage 98 to the source of fluid pressure. As seen in this FIGURE, it will be observed that the restriction 60, shown in diagrammatic FIGURE 1 as external to the valve 64, is in practice located within the valve housing 72.

The shaft 78 is provided with an axially extending passage 100 terminating at its lower end in a transverse passage 102 which is always in communication with the annular chamber 96. At its upper end the passage 100 terminates in a lateral passage 104 which normally permits the escape of fluid into the interior of the chamber 74 from which it drain through a port 106 to the return passage 66 to the reservoir. Keyed or otherwise secured to the shaft 78 is a support plate 108 having upstanding ears on which are pivoted weighted centrifugal levers 110 having arms 112 engageable with a tubular vertically slidable sleeve valve 114, adapted to move over and close the port of the transverse passage 104 upon attainment of a predetermined speed. The governed speed is controlled by a compression spring 116 engageable at its lower end with the sleeve valve 114 and at its upper end with an annular spring seat 118 provided with a ball bearing assembly indicated generally at 120. A spring adjuster 122 is threaded to a stem 124 projecting downwardly from the removable closure 76, and the bearing assembly is interposed between the spring adjuster and the spring seat 118.

Means are provided under the control of the operator of the vehicle for adjusting the speed at which the speed control valve operates to apply pressure tending to move the accelerator pedal in speed reducing direction.

Referring again to FIGURE 1, this structure includes a setting dial 126 having a knob 128 connected by a flexible cable 130 to a threaded pressure regulating speed selector valve 132, as best seen in FIGURE 2. The housing 72 includes a laterally extending portion 134 formed to provide a cylinder 136 in which is received a piston 138 connected by a rod 140 to a rack 142, as seen in FIGURE 3. The spring adjuster 122 is provided with teeth as indicated at 144, engageable by the rack teeth so that movement of the piston 138 results in rotation of the spring adjuster and a corresponding adjustment of the speed at which the sleeve valve 114 closes the lateral passage 104 in the spinner shaft 78.

Fluid is admitted under a controlled pressure to the cylinder 136 and this pressure is controlled by the valve 132. The pressure supply line 68 is connected to the port 146. A restricted passage 148 connects the cylinder 136 to the chamber 74. It will be recalled that the fluid supplied through the passage 68 is controlled by a pressure regulating valve 70. Accordingly, the flow of fluid past the valve 132 and through the restricted vent passage 148 provides a fluid pressure within the cylinder 136 determined by the adjustment of the speed selector valve 132.

The base pressure referred to in the foregoing is the pressure on the hydraulic motor side of the system when the passage 104 is completely uncovered and the constant pressure as determined by a pressure regulating bypass valve 56 is applied to the control valve shown in FIGURE 2. The restriction 60 reduces the hydraulic pressure since at this stage of operation the system is a flow system and therefore the piston 34 is not caused to move. If the governing system operates over, for example, a 15 pounds per square inch range, the base pressure is selected at some value just above zero, for example, one or two pounds per square inch. When the govenor is operating, the system approaches dead-end service and therefore the restriction does not affect the pressure to the same extent. As a limiting condition, pressure in the cylinder 32 may approach fifteen pounds per square inch.

Operation of the System at Governed Speed

While the operation of the system is probably apparent from the foregoing, it will be briefly described at this point. So long as the vehicle is operated at less than governed speed, the centrifugal force developed by the weighted levers 110, opposed by the spring 116, is insufficient to shift the sleeve valve 114 to position overlying the lateral passage 104. However, when the vehicle reaches governed speed the sleeve valve is moved upwardly by the centrifugal levers and initially restricts and may completely close the escape port of the passage 104 into the chamber 74. This immediately causes an increase in pressure in the system beyond the restriction 60 and fluid pressure is applied through the passage 42 to the right hand end of the cylinder 32 as seen in FIGURE 4. Thus, an increasing force is applied to the piston tending to move the throttle plate or throttle plates in speed reducing direction and to cause a corresponding movement of the accelerator pedal. The force thus applied is of course limited in magnitude by the setting of the pressure regulating bypass valve 56 so that at any time the operator may force the piston to the right, thus opening the throttle.

At cruising speed the operation of the system provides an ideal regulation without requiring the attention of the operator. The governed speed is set by the knob 128 and whenever this speed is reached a force tending to move the accelerator pedal against the foot of the operator is developed. Accordingly, the operator merely applies a standard and usual force to the accelerator pedal without particular attention as to the location of the pedal. The application of hydraulic pressure to the piston will be regulated by the centrifugal mechanism in such a way that the speed of the vehicle will be maintained within close limits at the selected speed.

Operation of the System at Wide Open Throttle

While the system operates to maintain the vehicle at a preset road speed under normal conditions, the vehicle is always under full control of the operator who may depress the accelerator pedal to any degree required in order to accelerate to avoid road hazards for example. Moreover, when the accelerator pedal is fully depressed so that the piston 34 is moved fully to the right and assumes the dotted line position shown in FIGURE 4, the hydraulic fluid admitted to the right hand end of the cylinder 32 is permitted to escape through the relieved portion 46 of the cylinder past the piston 34 and through the connection 48 and passage 50 to the reservoir. Thus, at wide open throttle, which would be accomplished only when the operator desires to pass another vehicle or under emergency conditions, the accelerator pedal is acted on only by the usual spring means tending to return it to throttle-closed position.

The foregoing provides a very convenient arrangement which permits the operator to overcome the increased resistance of the hydraulic means when he desires to accelerate the vehicle temporarily for passing or for emergency reasons. As soon as the passing has been accomplished or the emergency has terminated, the operator releases the accelerator pedal and permits it to start its movement in throttle closing direction. As soon as the piston moves sufficiently far to close the escape passage, the hydraulic pressure immediately becomes effective upon the piston tending to move the accelerator pedal in a speed reducing direction. This hydraulic force remains effective until the vehicle has once again reached the preselected governed speed.

The drawings and the foregoing specification constitute a description of the improved automobile speed control system in such full, clear, concise and exact terms as to enable any person skilled in the art to practice the invention, the scope of which is indicated by the appended claims.

What I claim as my invention is:

1. A vehicle speed control system comprising an accelerator pedal, a hydraulic motor connected to said pedal to oppose accelerating movement thereof, a source of hydraulic fluid under pressure, passage means connecting said source and motor including a speed responsive valve effective to control the application of pressure to said motor, a pressure limiting bypass valve between said source and speed responsive valve, a restriction in the passage means between said bypass valve and said speed responsive valve, said hydraulic motor comprising a piston and cylinder, and a lateral recess in the wall of said cylinder uncovered by said piston when said pedal is in full acceleration position to bypass fluid in said cylinder around said piston.

2. A speed limiting governor comprising a spinner shaft, centrifugal elements carried by said shaft, speed control means connected to said elements for movement thereby, a spring connected to said means, an adjustable spring seat connected to said spring, motor means for adjusting said spring seat, and motor control means including a speed setting control element remote from said motor, and actuating means connecting said element and motor.

3. A speed limiting governor comprising a spinner shaft, centrifugal elements carried by said shaft, speed control means connected to said elements for movement thereby, a spring connected to said means, an adjustable spring seat connected to said spring, a pressure responsive hydraulic motor connected to said seat, a supply passage including a metering valve connected to said motor, a restricted bleed passage connected to said motor whereby the pressure at said motor is determined by the relative restriction to flow afforded by said metering valve and bleed passage.

4. A speed limiting governor for an automobile comprising a spinner shaft, centrifugal elements carried by said shaft, speed control means connected to said elements for movement thereby, a spring connected to said means, an adjustable spring seat connected to said spring, a pressure responsive hydraulic motor connected to said seat, a supply passage including a metering valve connected to said motor, setting means including a manually movable member adjacent the driver's seat and actuating means connecting said movable member and valve, a restricted bleed passage connected to said motor whereby the pressure at said motor is determined by the relative restriction to flow afforded by said metering valve and bleed passage.

5. A speed limiting governor for an automobile comprising a spinner shaft, centrifugal elements carried by said shaft, speed control means connected to said elements for movement thereby, a spring connected to said means, an adjustable spring seat connected to said spring, a pressure responsive hydraulic motor connected to said spring seat, a supply passage including a rotatable valve connected to said motor, a flexible drive shaft connected to said valve and extending to the interior of the automobile, a restricted bleed passage connected to said motor whereby the pressure at said motor is determined by the relative restriction to flow afforded by said metering valve and bleed passage.

6. A speed limiting governor comprising a spinner shaft, centrifugal elements carried by said shaft, speed control means connected to said elements for movement thereby, a spring connected to said means, a rotatably adjustable spring seat connected to said spring, a pressure responsive hydraulic motor connected to said seat, a supply passage including a metering valve connected to said motor, a restricted bleed passage connected to said motor whereby the pressure at said motor is determined by the relative restriction to flow afforded by said metering valve and bleed passage, said motor comprising an expandible chamber into which fluid under pressure is admitted, resilient means opposing expansion of said chamber, a rack actuated by expansion of said chamber, and pinion means engaged by said rack and operably connected to said rotatably adjustable spring seat.

7. A speed limiting governor comprising a spinner shaft, centrifugal elements carried by said shaft, speed control means connected to said elements for movement thereby, a spring connected to said means, a rotatably adjustable spring seat connected to said spring, a pressure responsive hydraulic motor connected to said seat, a supply passage including a metering valve connected to said motor, a restricted bleed passage connected to said motor whereby the pressure at said motor is determined by the relative restriction to flow afforded by said metering valve and bleed passage, said motor comprising an expansible chamber into which fluid under pressure is admitted, resilient means opposing expansion of said chamber, a rack actuated by expansion of said chamber, said rotatably adjustable spring seat having pinion teeth thereon in mesh with said rack.

8. A vehicle speed control system comprising an accelerator pedal, a hydraulic motor connected to said pedal to oppose accelerating movement thereof, a source of hydraulic fluid under pressure, passage means connecting said source and motor including a speed responsive valve effective to control the application of pressure to said motor, a restriction in the passage means between said source and said speed responsive valve, said hydraulic motor comprising a piston and cylinder, and a lateral recess in the wall of said cylinder uncovered by said piston when said pedal is in full acceleration position to bypass fluid in said cylinder around said piston.

9. A vehicle speed control system comprising an accelerator pedal, a hydraulic motor connected to said pedal to oppose accelerating movement thereof, a source of hydraulic fluid under pressure, passage means connecting said source and motor including a speed responsive valve effective to control the application of pressure to said motor, a pressure limiting bypass valve between said source and speed responsive valve, said hydraulic motor comprising a piston and cylinder, and a lateral recess in the wall of said cylinder uncovered by said piston when said pedal is in full acceleration position to bypass fluid in said cylinder around said piston.

10. A vehicle speed control system comprising an accelerator pedal, a fluid motor connected to said pedal to oppose accelerating movement thereof, a source of fluid under pressure, passage means connecting said source and motor including a speed responsive valve effective to control the application of pressure to said motor, said motor comprising a piston and cylinder, and a lateral recess in the wall of said cylinder uncovered by said piston when said pedal is in full acceleration position to bypass fluid in said cylinder around said piston.

11. A speed control system comprising a speed control member, a pressure responsive motor connected to said speed control member to oppose speed increasing movement thereof, a source of pressure, passage means connecting said source and motor including a speed responsive assembly effective to control the application of pressure to said motor, said motor comprising a cylinder and a piston reciprocal within the cylinder and connected to the speed control member, and a recess in the wall of the cylinder uncovered by said piston when the speed control member is in full speed increasing position to bypass fluid in the cylinder around the piston.

12. A vehicle speed control system comprising an accelerator pedal, a hydraulic motor connected to said pedal to oppose accelerating movement thereof, a source of hydraulic fluid under pressure, passage means connecting said source and motor including a speed responsive bypass valve connected to said passage effective to control the application of pressure to said motor, a restriction in the passage between said source and said speed responsive valve, a pressure limiting bypass valve in said passage, said hydraulic motor comprising a piston and cylinder, and a lateral recess in the wall of said cylinder uncovered by said piston when said pedal is in full acceleration position to bypass fluid in said cylinder around said piston.

References Cited in the file of this patent

UNITED STATES PATENTS

| | | |
|---|---|---|
| 2,111,284 | Girl et al. | Mar. 15, 1938 |
| 2,260,576 | Maybach | Oct. 28, 1941 |
| 2,324,191 | Bowers | July 13, 1943 |
| 2,369,397 | Kostenick | Feb. 13, 1945 |
| 2,486,369 | Goss | Oct. 25, 1949 |
| 2,661,071 | Hoener | Dec. 1, 1953 |
| 2,765,800 | Drake | Oct. 9, 1956 |
| 2,897,906 | Bruder | Aug. 4, 1959 |
| 2,910,974 | Caris | Nov. 3, 1959 |
| 2,916,100 | Teetor | Dec. 8, 1959 |
| 2,972,390 | Bunker et al. | Feb. 21, 1961 |
| 2,976,946 | Denman et al. | Mar. 28, 1961 |

OTHER REFERENCES

Dyke's Automobile and Gasoline Engine Encyclopedia, twentieth edition of 1943, page 160.